Patented June 11, 1946

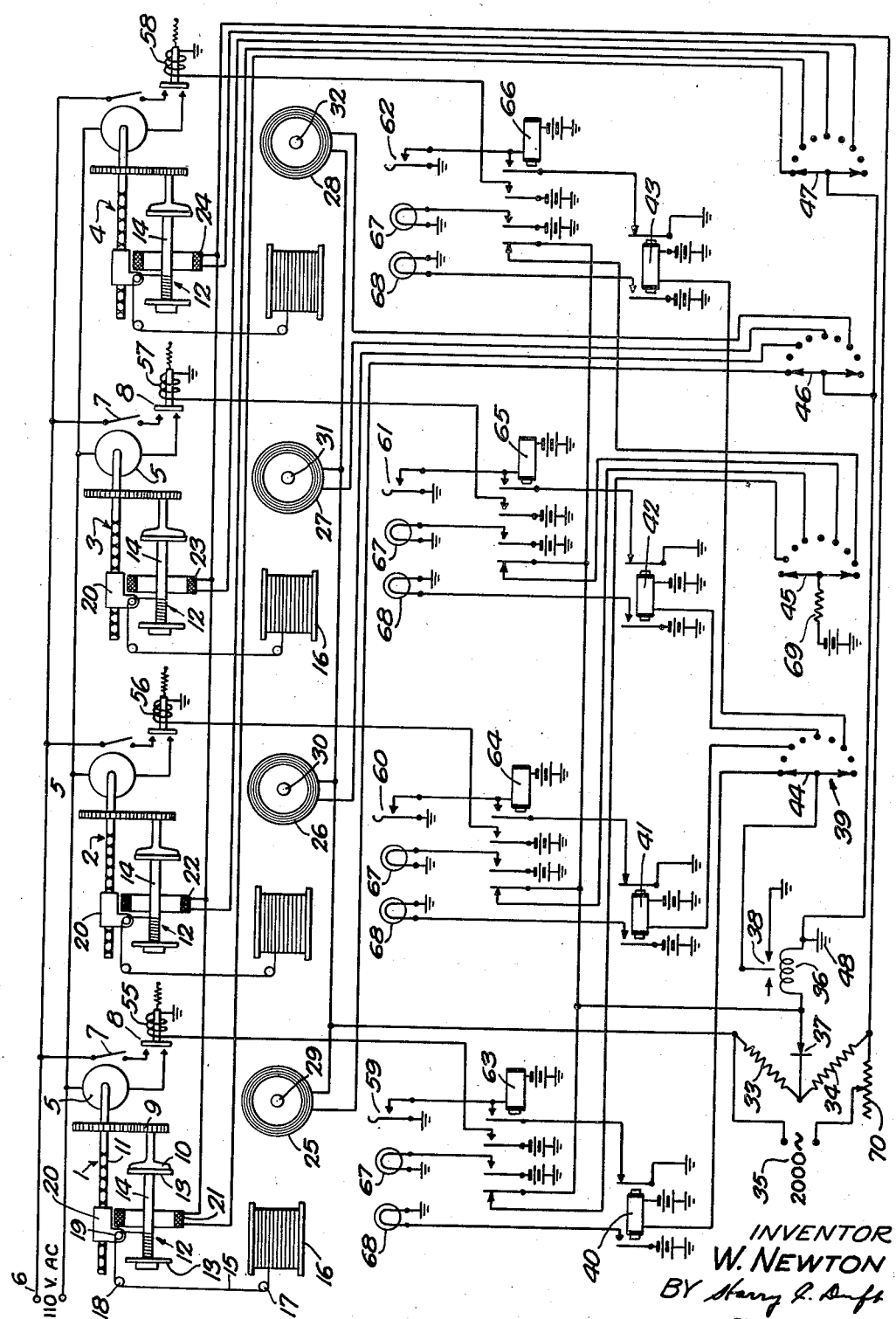

2,401,954

UNITED STATES PATENT OFFICE 2,401,954

TESTING APPARATUS

William Newton, Notre Dame de Grace, Quebec, Canada, assignor to Western Electric Company, Incorporated, New York, N. Y., a corporation of New York Application February 6, 1943, Serial No. 474,959

6 Claims. (Cl. 242—9)

This invention relates to testing apparatus and more particularly to apparatus for testing coils being wound simultaneously on a plurality of winding mechanisms.

It is an object of the present invention to reduce the amount of apparatus necessary for testing a plurality of coils being wound simultaneously.

In accordance with one embodiment of the invention, each of the winding mechanisms has a search coil and a balancing coil individual to it for constituting two arms of a Wheatstone bridge including two arms common to all of the winding mechanisms. The search coils are moved contemporaneously with the distribution of wire on the coils being formed and are connected sequentially to the common arms of the bridge circuit whereby the occurrence of a fault in the coil being wound will unbalance the bridge circuit, which will complete circuits to stop the winding mechanism in which the defective coil is being wound and to indicate such condition.

A better understanding of the invention may be had by reference to the following detailed description of one embodiment thereof when considered in conjunction with the accompanying drawing, wherein the single figure includes a circuit diagram of the electrical connections and apparatus and a schematic of the winding apparatus with which the circuit cooperates.

In the drawing, there are shown four winding mechanisms, designated generally by the numerals 1, 2, 3 and 4. The winding mechanisms are all of exactly the same construction and only one of them will be described in detail, that is, the winding mechanism 1. In the winding mechanism 1, there is provided a motor 5 adapted to be connected to a 110 volt alternating current source at 6 through a manually operable switch 7 and a normally open solenoid actuated switch 8. The motor 5, through suitable gearing, as indicated at 9, drives a chuck 10 and a distributor shaft 11. The chuck 10 is adapted to hold and rotate a spool 12 composed of a pair of heads 13—13 and a core 14 on which a strand of insulated wire 15 is to be wound. The strand of wire 15 may be withdrawn from a supply spool 16, passing over guide sheaves 17, 18 and 19. The guide sheave 19 is mounted upon a distributor member 20, adapted to be moved back and forth on the distributor shaft 11 by the usual double thread, as indicated diagrammatically in the drawing. In addition to supporting the guide sheave 19, the distributor member 20 also carries a search coil 21, which will thus be carried back and forth with the distributor and which serves as a detector, in conjunction with the circuit with which it is connected, for any flaws in the insulation of the wire being wrapped on the core 14, which will cause a short circuit in the winding.

The structure described hereinbefore is duplicated in each of the winding mechanisms 1, 2, 3 and 4 and the winding mechanisms 2, 3 and 4 have search coils 22, 23 and 24 associated with them which are similar to the search coil 21 in the winding mechanism 1. In addition to the search coils 21, 22, 23 and 24, each of the winding mechanisms have individual to it a standard coil 25, 26, 27 and 28, respectively, equipped with cores 29, 30, 31 and 32, similar to the core 14 in its associated winding mechanism. The standard coil and the search coil at each of the winding mechanisms are periodically associated with a pair of resistance arms 33 and 34 and when one search coil and its associated standard coil are connected to the resistance arms 33 and 34, they will complete a Wheatstone bridge circuit to which power is supplied from a 2,000 cycle oscillator supply 35.

From the foregoing, it will be apparent that the resistance arms 33 and 34 are common to all of the winding machines and, when connected to the search coil and standard coil at a winding machine, will constitute a bridge circuit. The bridge circuit has connected across it a highly sensitive meter type relay 36 in series with a rectifier 37, which will permit the current to flow across the coil of the meter type relay only in one direction and when the bridge circuit, including the resistance arms 33 and 34 is unbalanced, the current will flow in said direction to energize the coil of the meter type relay and cause it to close its contacts 38. The contacts 38 are periodically connected through the operation of a stepper switch, designated generally by the numeral 39, sequentially to the windings of relays 40, 41, 42 and 43. The stepper switch 39 is provided with four brushes 44, 45, 46 and 47 and may be set in operation in any suitable manner to step its brushes into association with banks of contacts individual thereto step by step while the apparatus is in operation. The brushes 46 and 47 are connected to one side of the coil of the meter type relay and to ground at 48. When the brushes 46 and 47 are moved step by step into contact with the contacts of their associated banks, they will first serve to connect the standard coil 25 and search coil 21 to the opposite ends of the resistance arms 33 and 34 while the brushes are in the position shown.

As soon as the brushes 46 and 47 step out of contact with the first contacts in their associated banks, as shown, they will each engage an idle contact and will then, on their next step, serve to connect the coils 22 and 26 to the resistance arms 33 and 34 and as the brushes 46 and 47 continue to step into engagement with their associated contacts, they will, in succession, form a bridge circuit associated with each of the winding machines 1, 2, 3 and 4, utilizing the common resistance arms 33 and 34 and the paired search and standard coils at each winding machine. So long as no flaws are detected in the windings applied to the cores 14, at the various winding mechanisms, the bridge circuits thus set up will remain in balance, but when a short circuited turn is detected, the electrical characteristics of the search coil associated with the mechanism in which the defective winding occurs will cause the bridge circuit to be unbalanced and since all of the brushes 45, 46 and 47 step in unison, the relays 40, 41, 42 or 43 associated with the winding mechanisms 1, 2, 3 or 4, in which a defective coil is being wound, will be energized to give a visual indication that such a defect has occurred and to break the connection from the power source to the winding motor at that particular winding mechanism. The power source to the motor 5 at the various winding mechanisms is completed, as pointed out hereinbefore, through the normally open solenoid operated switch 8 and power is supplied to energize a solenoid 55, a solenoid 56, a solenoid 57 and a solenoid 58, after closing the switch associated with the motor 5 in the winding mechanisms 1, 2, 3 and 4, respectively, when the relays 40, 41, 42 and 43 associated with those winding mechanisms are deenergized. At the initiation of the operation of the various winding mechanisms, the test circuits therefor may be rendered operative by closing switches 59, 60, 61 and 62 at the respective winding machines to energize relays 63, 64, 65 and 66, which will lock up through their locking contacts and connect ground at the relays 40, 41, 42 and 43 to hold the relays 63, 64, 65 and 66 energized until their associated relays 40, 41, 42 and 43 are energized.

In the normal operation of the apparatus, when no faults are found in the coils being wound, a green signal lamp 67 at each winding mechanism will have battery connected to it through a contact of its associated relay 63, 64, 65 or 66 to indicate that the operation of the apparatus is proceeding in a satisfactory manner. However, as soon as a fault occurs in any one of the winding mechanisms, a red lamp 68 associated therewith will have current supplied to it from grounded battery at the make contact of its associated relay 40, 41, 42 or 43.

Any time the meter type relay 36 is energized to close the contacts 38, there will be a tendency for the contacts to remain locked and, accordingly, the brush 45 is provided for supplying a releasing or kick back current to the core of the meter type relay 36 through the second, fourth, sixth and eighth contacts of its associated contact bank.

A better understanding of the apparatus may be had by reference to the following brief description of the mode of operation thereof. Operators at the various winding mechanisms 1, 2, 3 and 4 may initiate operation of their respective winding mechanisms by closing the switches 7 associated therewith and the switches 59, 60, 61 and 62, selectively. When any one of the switches 59 to 62 and its associated switch 7 are closed, the solenoid 55, 56, 57 or 58 associated with the winding mechanism to be operated will be energized to close the solenoid operated switch 8 over a circuit from grounded battery at one of the make contacts of the relay 63, 64, 65 or 66. The other make contact of the relay 63, 64, 65 or 66 will connect battery associated with it to the green signal lamp 67 associated with the operated relay and due to the operation of the relay 63, 64, 65 or 66, its associated relay 40, 41, 42 or 43 will supply ground at its break contact to lock the relay 63, 64, 65 or 66 energized.

Prior to the initiation of the operation of a winding machine, it is necessary to connect the 2,000 cycle oscillating supply to the bridge circuit including the resistance arms 33 and 34 and to initiate the step by step operation of the brushes 44 to 47, inclusive. The tests on the coils being wound will take place sequentially if the winding machines are operated and the brush 44 will prepare a circuit through its associated contacts to the relays 40, 41, 42 and 43 in sequence. If no faults in the coils being wound are found by the search coils 21, 22, 23 and 24, the winding mechanisms 1, 2, 3 and 4, which have been started in operation manually by the closure of switch 7 associated therewith and the manually operable switches 59, 60, 61 and 62, the search coils and their associated standard coils 25 will be connected to the resistance arms 33 and 34 through the brushes 46 and 47, in sequence once for each half rotation of the brushes 44 to 47 and since the standard coils 25, 26, 27 and 28 correspond to the coil being wound in the various winding mechanisms, the bridge will remain balanced each time the circuit to it is completed, unless there is some fault in the insulation of the coil being wound. When a fault occurs in one of the coils being wound, for example, the coil in the winding mechanism 1, the balance between the search coil 21 and the standard coil 25 will be disturbed by the change in inductance between the search coil and the coil being wound and, accordingly, the meter type relay 36 will be operated to close its contacts 38 and will supply ground from the contacts of the meter type relay through the brush 44 to energize the relay 40. As soon as the relay 40 operates, it will break the locking ground to the relay 63 and will attract its make contact to supply battery to the red signal lamp 68 associated with winding mechanism 1. The relay 63 will thereupon deenergize and cannot be reenergized until the switch 59 is operated manually. When the relay 63 is deenergized, its lefthand break contact will connect battery through a restoring circuit including resistance 69 to restore the meter type relay 36 to normal position, as shown. However, the next time the brush 44 engages its first contact, the relay 40 will again be energized unless the unbalanced condition between the search coil 21 and standard coil 25 is corrected. Thus, the red signal lamp 68 will flash until the balanced condition between the search coil 21 and standard coil 25 is reestablished by removing the defective coil winding at the winding mechanism 1. As soon as the defective winding at winding mechanism 1 has been removed, the testing operation may be reinitiated by again closing the switch 59 and a new test will proceed. The relays 41, 42 and 43 will be energized if the strand of wire being fed to the winding mechanisms 2, 3 or 4 is defective in a manner similar to that described in connection with the winding mechanism 1 and the brushes 44 to 47 will prepare a circuit to the meter type relay 38 repeatedly under control of the relays 40, 41, 42 and 43 in sequence and will simultaneously, with the association of the brush 44 with the relay 40 to 43, connect the search coils 21, 22, 23 and 24 and standard coils 25, 26, 27 and 28, respectively, into the bridge circuit, the brush 45 serving to restore the meter type relay if necessary after it has been associated with each of the relays 40 to 43.

In this manner, the resistance arms 33 and 34, to which the supply of power from the oscillator may be regulated by an adjustable resistance 70, are made common to the four winding machines and, therefore, it is not necessary to duplicate all of the equipment at each winding mechanism.

What is claimed is:

1. The combination of a coil winding machine having means for rotating a core and a distributor for distributing wire as it is wound on the core with a testing apparatus for coils being wound comprising a search coil mounted on the distributor in such position that its effective inductance will be varied by the presence of a short circuit in a coil being wound, and a circuit intermittently connected to the search coil and responsive to the effective inductance thereof to control operation of the means for rotating the core.

2. The combination of a coil winding machine having means for rotating a core and a distributor for distributing wire as it is wound on the core with a testing apparatus for coils being wound comprising a search coil mounted on the distributor to encircle the coil being wound and vary in effective inductance upon the occurrence of a short circuit in the coil being wound, a test circuit responsive to the effective inductance of the search coil and connectible to the search coil, and means for intermittently connecting the search coil to the circuit.

3. The combination of a coil winding machine having means for rotating a core and a distributor for distributing wire as it is wound on the core with a testing apparatus for coils being wound comprising a search coil variable in effective inductance in response to the occurrence of a short circuit in a coil being wound in the machine and mounted on the distributor, a test circuit responsive to the effective inductance of the search coil for controlling the operation of the means for rotating the core, and means for connecting the search coil to the test circuit.

4. The combination of a coil winding machine having means for rotating a core and a distributor for distributing wire as it is wound on the core with a testing apparatus for coils being wound comprising a search coil mounted on the distributor and variable in effective inductance in response to faults in the coil being wound, a test circuit responsive to variations in effective inductance of the search coil and connectible to the search coil, and means for intermittently connecting the test circuit to the coil.

5. The combination of a plurality of coil winding machines each having a distributor for distributing wire on a coil and means individual to each machine for driving it, with a search coil variable in effective inductance in response to a short circuit in a coil being wound and individual to each machine and mounted on the distributor of the machine, a standard coil individual to each machine, a pair of resistance arms common to all of the machines, means for periodically associating each search coil and standard coil with said resistance arms to complete a test circuit for a coil being wound in the machine associated with the search and standard coil and responsive to the effective inductance of the search coil, and means selectively controlled by the test circuit for stopping operation of any one of the driving means for the coil winding machines in which a defective coil is found by the test circuit.

6. The combination of a plurality of coil winding machines with a search coil individual to each machine and variable in effective inductance by the presence of a short circuit in a coil being wound in the machine, a standard coil individual to each machine, a pair of resistance arms common to all of the machines, means for periodically associating each search coil and standard coil with said resistance arms, one set at a time and in sequence, to complete a test circuit for a coil being wound in the machine associated with the search and standard coil and responsive to the effective inductance of the search coil, manually operable means for initiating operation of the test circuit and winding machine, and means under control of the test circuit for selectively stopping operation of a winding machine in which a defective coil is found by the test circuit.

WILLIAM NEWTON.